No. 724,068. PATENTED MAR. 31, 1903.
H. D. WILLIAMS.
DOUBLE UNIVERSAL JOINT.
APPLICATION FILED SEPT. 17, 1902.
NO MODEL.
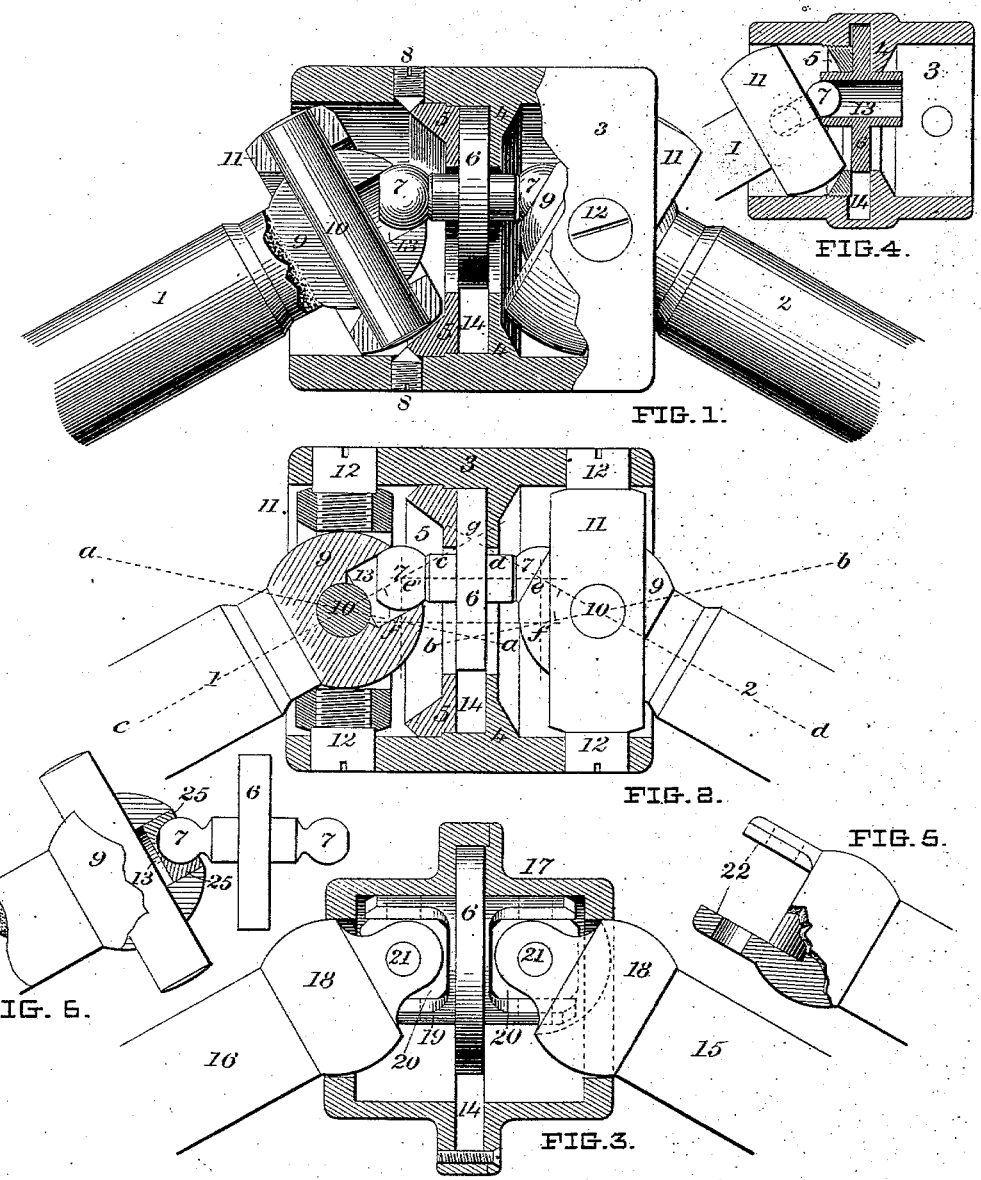
WITNESSES,
INVENTOR,
HARVEY D. WILLIAMS,
By Franklin Scott,
ATTORNEY.

UNITED STATES PATENT OFFICE.

HARVEY D. WILLIAMS, OF WASHINGTON, DISTRICT OF COLUMBIA, ASSIGNOR OF ONE-HALF TO WATERBURY TOOL CO., OF WATERBURY, CONNECTICUT.

DOUBLE UNIVERSAL JOINT.

SPECIFICATION forming part of Letters Patent No. 724,068, dated March 31, 1903.

Application filed September 17, 1902. Serial No. 123,764. (No model.)

*To all whom it may concern:*

Be it known that I, HARVEY D. WILLIAMS, of the city of Washington, in the District of Columbia, have invented certain new and useful Improvements in Double Universal Joints; and I hereby declare that the subjoined description, in connection with the accompanying drawings, constitutes a specification thereof and of the best method of carrying out the same.

This invention is applicable to couplings between sections of shafting where it is desirable to transmit uniform velocity from a driving to a driven section through universal joints.

It is well known that where two shafts are coupled by a single universal joint, like the Hooke joint, for instance, with their axes inclined to each other and uniform rotary motion is imparted to one the other will not revolve with a similar uniform velocity; but, on the contrary, during one quarter of its revolution its velocity will progressively increase and during the next quarter it will correspondingly decrease, followed by a like accelerated movement through the third quarter and a similar decreasing velocity through the last quarter.

It has further been demonstrated that if an intermediate revoluble member be interposed between the two shafts, with the ends of which the ends of the respective shafts be coupled by universal joints, a velocity may be imparted to the driven shaft through such intermediate member which will be concurrent and synchronous with that of the driving-shaft as long as equiangularity between the axis of the intermediate member and the respective axes of the two connecting-shafts is maintained. When this equiangularity is preserved in action and the velocity of the driving-shaft is regular and uniform, the velocity of the intermediate member will exhibit the variableness and irregularity above described; but by reason of the similar but inverted conditions appertaining to the transmitting connection with the driven shaft this irregular velocity will be transmuted into a movement and velocity which will be both concurrent and synchronous with that of the driving member. So far as known no provisions for maintaining this condition of equiangularity under all conditions of practical use have hitherto been devised, either when only one or both of the connected sections were movable. The object of this invention is to supply such want. My invention accomplishes this object by introducing a supplemental loose coupling member which parallels the positive or driving coupling and which connects the two shafts by telescopic joints at points in their axes equidistant from the centers of the positive coupling-joints. These two intermediate coupling-links are also fitted with a coöperative device which maintains constant axial parallelism between them and prevents endwise movement of one with reference to the other.

With this improvement when the shafts are brought into line coaxially all the other parts will also fall into line correspondingly.

The invention comprises two members, one contained within the other. One of these, and it may be either, called the "coupling," has each of its ends positively connected by some universal connection with a shaft-section, and the other member, called the "equalizer," which either envelops or is enveloped by the first and in relation thereto is adapted to move, slide, or revolve in a plane perpendicular to the axis of the coupling, couples with the shafts by universal telescopic connections or by a joint which will permit longitudinal movement of one part upon or within the other, akin to a ball moving within a tube.

My invention differs from those universal joints in which both shafts couple with an interposed member or block and both swing around a common center in this, that each shaft couples with the interposed member by a separate connection and a supplemental interposed member is introduced which is journaled upon or within the coupling member and is operatively connected with both shafts, the office of which is to symmetrize the action of both shafts.

The invention is disclosed in the drawings, in which—

Figure 1 shows it as applied to the ends of two sections of a flexible shaft, a part thereof being shown in axial section taken through the plane of the shafts. Fig. 2 is a similar sectional view showing the relation of the various parts after a quarter-revolution of the shafts from the position shown in Fig. 1 has taken place. In Figs. 1, 2, and 4 the member which couples the shafts is the external member. Fig. 3 shows the same invention with the coupling inclosed, the inclosing case being the equalizer. Fig. 4 shows a modification of the device shown in Fig. 1, the members of the ball and tubular-socket connections between the equalizing devices being transposed from the positions seen in Fig. 1. Fig. 5 is a detail view, partially in section, of the coupling end of one of the shafts shown in Fig. 3. Fig. 6 shows a detail in axial section of a concavo-cylindrical shell-bearing interposed between the ball of the equalizer and the inner wall of the socket in the end of the shaft.

In the modification of my invention shown in Figs. 1 and 2 the two shafts are shown at 1 and 2, of which 1 for convenience may be called the "driver." The end of each shaft is spherically finished, as at 9, to fit the inside of the ring 11, which is pivoted thereon by the pin 10. The rings 11 11 are also journaled in the ends of cylinder 3 by trunnions 12, which are arranged at right angles to pin 10. The exterior of the rings 11 11 may also be spherically finished, so as to fill the bore of the cylinder to prevent play of the connected parts, to preserve correct adjustment of the connected parts, and to close the interior of the cylinder closely, so that it may carry a lubricant, if desired. So much of the apparatus may be considered as old, (details of construction excepted,) and either shaft would be free to swing about the intersection of its pin and trunnion axes without reference to the other. Therefore to carry out the purpose of my invention I have constructed within the cylinder a circumferential channel 14, the opposing walls of which are parallel, within which a disk of smaller diameter than the interior diameter of the channel is fitted to slide or rotate, but cannot move in direction of the axis of the cylinder. From the sides of this disk central hubs project, having ball-shaped ends 7 7, which fit and are adapted to slide in tubular sockets 13, provided therefor in the ends of the shafts. One of the channel-walls 5 may be removable to allow the disk to be taken out and may be held in operative position by the set-screws 8 8. If desired, this annulus may be made adjustable by fitting it to screw into position as shown in Fig. 4, so that a proper sliding fit between the disk and its channel-walls can be secured. By these means parallelism or coincidence between the axis of the cylinder and the axis of the disk-hubs, which connects the centers of oscillation of the ball-and-socket connections 7 13 7 13, will always be maintained. The alternate construction shown in Fig. 4 in no respect differs in principle from the mechanism of Fig. 1, except that the positions of the balls 7 7 and tubular sockets 13 are transposed, the balls being carried on the ends of the shafts, while the hub of the disk is made in tubular form to receive them. Thus it is apparent that the disk 6 is free to slide or rotate in its channel in obedience to any leverage brought to bear on it by changing the position of the driving-shaft with reference to the axis of the coupling member.

The principle of operation of these devices to maintain uniformity of the angular relation between the axes of the shafts and the axis of the coupling member, upon which uniformity of velocity of the two shafts depends, is illustrated in Fig. 2 by the diagram in dotted lines. The axis of shaft 1 is indicated by the line $c\,c$ and the axis of the equalizer by the line $e'\,e$. The axes of the shafts produced will intersect at $g$. From the fact that the centers of oscillation of the shafts are in the axis of the cylinder in which they are pivoted and the axis of the equalizer is parallel with that of the cylinder when the shafts are inclined it follows that, by reason of the connection between the equalizer and the shafts through the ball-and-socket connection 7 13 or its equivalent, when the inclination of one of the shafts is changed it must oscillate on its pivot at the intersection of the axes of pin 10 and trunnion 12, or at 10, as appears in Fig. 2. This center is in the nature of a fulcrum, on which the shaft oscillates. Socket 13 is at the short arm of the lever and when moved carries the ball end 7 of the equalizer with it, thus sliding the disk in its seat 14 and carrying the opposing ball along with it, and through this socket connection with the other shaft causes it to turn on its own fulcrum-pivot and reflect the movement of the first shaft. The diagram shows that the angles $g\,e\,e'$ and $g\,e'\,e$ are equal, a circumstance resulting from the fact that each half of the apparatus is the exact counterpart of the other half, and if shaft 1 be swung from its full-line position to a position coinciding with the line $a\,a$ the movement will force the axis of the equalizer from its upper position down to the position shown by axial line $f f$ and the other shaft from its full-line position to that shown by line $b\,b$. Then the angles $f f a$ and $f f b$ will be equal, and the velocity of the driven shaft will correspond with that of the driver.

In the above-described construction the shafts are universally jointed to the outer case 3 by positive connection, so that the case or coupling rotates with the irregular action characteristic of the driven member where only an ordinary single joint is employed; but this irregular action does no harm, for the reason that by transmitting it to the other shaft through a duplicate of the apparatus which caused it by reflex action it becomes transmuted into motion and velocity, which exactly correspond with that of the driving-shaft. Thus if the velocity of the driving-shaft be uniform and constant that of the driven shaft will also be so.

In the modification shown in Fig. 3 the shafts 15 and 16 are coupled to the inner instead of the outer member of the equalizing devices, as in Fig. 1. For this purpose the equalizer 17 is made in two halves in tubular form so flanged that when united a disk-channel 14 is left between the flanges. The ends of the shafts are spherically shaped, so as to fill and turn within the open ends of the tubular equalizer 17. The combination of disk 6 and channel 14 in Fig. 3 performs the same function as the same combination performs in the construction shown in Fig. 1— that is, to preserve axial parallelism between the coupling and equalizer and prevent relative longitudinal displacement between them. The hubs of the coupling are forked, as at 19, Fig. 3, and the ends of the shafts are similarly forked, as at 22. Both members are coupled to an interposed block 20 by pins, so as to form a universal joint in the usual way. Thus arranged perfect equivalency of the elements of the invention and their combination shown in the several modifications illustrated subsists, and the mechanical law of their operation is identical. This equivalency appears in the following common characteristics: Each shaft has two points of oscillation in its axis, one around which itself turns and the other about which the equalizer turns, a coupling member which positively articulates by a universal connection with each shaft, an equalizing member carried by the coupling member and provisions therebetween for facilitating free movement of the former in a definite plane transverse to the axis of the latter, and a separable universal connection between the equalizing member and each shaft.

Referring to the construction shown in Fig. 1, it will be seen that when in action the friction between ball 7 and the interior of socket 13 will be confined to an annular line of contact between those parts. To provide against undue wear of contiguous parts on such line of contact, I have devised a shell-bearing 25, Fig. 6, to be interposed between the ball 7 and wall of socket 13. This shell may be made in halves for convenience in assembling or in any other suitable way, and its object is to secure surface instead of annular contacts between ball and shaft. The interior of this shell is concaved to fit the ball, and its exterior is of cylindrical form to fit the socket in the end of the shaft. This provision greatly promotes the durability and accurate operation of the device.

I therefore claim as my invention and desire to secure by Letters Patent—

1. The combination of two sections of shafting, an intermediate coupling with which each of said sections is positively connected, a separate universal joint connecting said sections with said coupling, an equalizer carried by said coupling, a loose universal joint connecting each of said shaft-sections with the equalizer at points in their axes equidistant from the coupling connections, and provisions connected with the coupling and equalizer for sustaining axial parallelism and for preventing relative longitudinal displacement therebetween, substantially as specified.

2. The combination of two sections of shafting, an intermediate coupling with which each of said sections is positively connected, separate universal joints connecting said sections with said coupling, an equalizer carried by said coupling, a loose universal joint connecting each of said shaft-sections with the equalizer at points in their axes equidistant from the coupling connections, and provisions connected with the said shaft-sections, coupling and equalizer, for maintaining equiangularity between the axes of the shaft-sections and the axis of the coupling, substantially as specified.

3. The combination with two sections of shafting of a coupling and an equalizer, one of which incloses the other, the extremities of said coupling and equalizer being connected with said sections at separate but equidistant points, and mechanism connecting with the coupling and equalizer for maintaining axial parallelism and preventing relative longitudinal displacement therebetween, substantially as specified.

4. The combination with two sections of shafting, of a coupling and an equalizer, one of which envelops the other, universal joints connecting the extremities of said coupling and equalizer with said sections at separate but equidistant points, and mechanism connected with said sections, coupling and equalizer for maintaining equiangularity between the axes of the shafts and the axis of the coupling, substantially as specified.

5. The combination of two sections of shafting and an interposed coupling, universal joints connecting the opposite ends of said coupling with the said sections, and devices connected therewith for maintaining equiangularity between the axes of the shaft-sections and the axis of the coupling while in action, substantially as specified.

6. The combination of a tubular coupling and two shafts, universal joints positively connecting said shafts with said coupling, an inclosed equalizing member, universal connections between said equalizing member and said shafts, said equalizing member having intermediate its ends a transverse flange standing at right angles to its axis which is fitted to coöperate with circumferential guides on the inside of the coupling, substantially as specified.

7. The bisected socket-bearing, in combination with shafts, each having a tubular bore in its end in which the socket can have longitudinal play, and an equalizer, with a ball on each end of the axis thereof, fitted to turn in said bearing, substantially as specified.

In testimony whereof I have hereunto subscribed my name, this 5th day of August, A. D. 1902, in the presence of two witnesses.

HARVEY D. WILLIAMS.

Witnesses:
J. DE BREE HIGGINS,
F. S. MORAN.